US009800449B2

(12) United States Patent
Yensen et al.

(10) Patent No.: US 9,800,449 B2
(45) Date of Patent: Oct. 24, 2017

(54) FREQUENCY AND TIME DOMAIN STREAMING RECEIVER

(71) Applicant: Allen-Vanguard Corporation, Ottawa (CA)

(72) Inventors: Trevor N. Yensen, Ottawa (CA); Oktay Ureten, Ottawa (CA); Gilad Helman, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 0 days.

(21) Appl. No.: 14/966,833

(22) Filed: Dec. 11, 2015

(65) Prior Publication Data

US 2017/0085408 A1 Mar. 23, 2017

Related U.S. Application Data

(60) Provisional application No. 62/140,800, filed on Mar. 31, 2015.

(51) Int. Cl.
| | |
|---|---|
| *H04B 1/38* | (2015.01) |
| *G06F 15/16* | (2006.01) |
| *H04L 27/26* | (2006.01) |
| *H04B 1/06* | (2006.01) |
| *H04B 1/04* | (2006.01) |
| *H04B 1/16* | (2006.01) |
| *H04B 7/08* | (2006.01) |
| *H04B 1/00* | (2006.01) |

(52) U.S. Cl.
CPC ......... *H04L 27/2647* (2013.01); *H04B 1/006* (2013.01); *H04B 1/0483* (2013.01); *H04B 1/06* (2013.01); *H04B 1/16* (2013.01); *H04B 1/38* (2013.01); *H04B 7/0817* (2013.01)

(58) Field of Classification Search
CPC ... H04B 1/02; H04B 1/16; H04B 1/04; H04B 1/7183; H04B 1/38; H04B 1/69; H04B 7/02; H04B 10/60; H04B 17/309
USPC .......................................... 375/219; 709/249
See application file for complete search history.

(56) References Cited

U.S. PATENT DOCUMENTS

| | | |
|---|---|---|
| 6,292,128 B1 | 9/2001 | Tsui et al. |
| 6,377,617 B1 | 4/2002 | Nara |
| 6,484,111 B1 | 11/2002 | Nara |
| | (Continued) | |

OTHER PUBLICATIONS

"Serial Interface for Data Converter", JEDEC Standard JESD284B01, JEDEC Solid State Technology Association, Jan. 2012, pp. 1-145.

(Continued)

*Primary Examiner* — Daniel Washburn
*Assistant Examiner* — Sarah Hassan
(74) *Attorney, Agent, or Firm* — Warner Norcross & Judd LLP

(57) ABSTRACT

A wideband signal processing receiver system including an interface for connecting to an analog to digital converter (ADC) of a broader signal chain lineup, wherein the interface receives digital data from the ADC, and a field programmable gate array (FPGA) and associated configuration for converting the digital data into two digital signal paths. The two digital signal paths include a frequency domain path and an optionally decimated time domain path. A memory and/or high speed bus stores or transfers high speed bus/link data from the frequency domain path and the time domain path.

10 Claims, 4 Drawing Sheets

(56) References Cited

U.S. PATENT DOCUMENTS

| | | | | |
|---|---|---|---|---|
| 7,830,456 B1* | 11/2010 | Vysyaraju | .............. | H04B 1/28 |
| | | | | 348/725 |
| 2005/0041728 A1* | 2/2005 | Karlsson | ................ | H04K 3/42 |
| | | | | 375/219 |
| 2006/0291631 A1* | 12/2006 | Hosoi | .................. | G01R 23/16 |
| | | | | 379/88.07 |
| 2007/0079012 A1* | 4/2007 | Walker | ................ | G06Q 20/32 |
| | | | | 709/249 |
| 2008/0056337 A1* | 3/2008 | Tal | ...................... | H03B 21/02 |
| | | | | 375/219 |
| 2009/0004981 A1* | 1/2009 | Eliezer | ................ | H03F 1/0211 |
| | | | | 455/127.1 |
| 2011/0193739 A1* | 8/2011 | Strauch | ................ | G01S 7/006 |
| | | | | 342/146 |
| 2012/0179415 A1 | 7/2012 | Nara | | |
| 2014/0064346 A1* | 3/2014 | Dobyns | ............ | G01R 13/0236 |
| | | | | 375/224 |

OTHER PUBLICATIONS

VITA Radio Transport (VRT) Draft Standard, VITA 49.0-2007, Draft 0.21, Oct. 31, 2007, pp. 1-180.

Analog Applications Journal, Texas Instruments Incorporated, First Quarter, 2014, pp. 1-35.

Neu, Thomas, "Ready to make the jump to JESD204B?", Texas Instruments Incorporated, Apr. 2015, pp. 1-11.

\* cited by examiner

FREQUENCY AND TIME DOMAIN STREAMING RECEIVER

RELATED APPLICATIONS

This application claims priority to U.S. Provisional Application No. 62/140,800 filed Mar. 31, 2015; the contents of which are herein incorporated by reference in their entirety.

TECHNICAL FIELD

The present disclosure relates generally to receiver signal processing in radio frequency (RF) communications. More specifically it relates to a frequency and time domain streaming receiver.

BACKGROUND

There are numerous Electronic Warfare (EW) devices that use Radio Frequency (RF) technology. Military units employ various apparatuses both offensively and defensively to protect soldiers' lives and collect signals intelligence and communicate on the battlefield.

RF signals can be stored and/or analyzed in either the frequency domain, or the time domain. The time domain refers to variation of signal amplitude over time, and the digital information is often conveyed as a function of voltage. Frequency domain refers to measuring amplitude and phase vs frequency. A transformation, such as a Fourier transformation, can be used to convert a time domain signal to a frequency domain signal and vice versa.

Signal sources and interference are often defined in the time domain, while system behavior and signal transformations are more convenient and intuitive when working in the frequency domain. Signals are generally received digitally in the time domain and then often converted to the frequency domain dependent on the choice of the signal processing algorithm to be applied.

Depending on the specific application, it may be advantageous to store frequency or time domain data in real-time, particularly where analysis or responses to military threats or signals may better be undertaken based on data in one of time or frequency domain.

Accordingly, it would be beneficial to have a receiver for electronic warfare applications capable of storing signals (or providing signals to be stored) in both frequency and time domains, without the need for processor intensive mathematical conversions between one and the other. This is particularly the case where power and size requirements limit the capability to provide sufficiently strong computing or processing capabilities in a device intended for use in the field. Further, some algorithms benefit from parallel time and frequency domain signal paths.

SUMMARY OF THE INVENTION

In one embodiment of the invention, there is provided a wideband signal processing receiver system including an interface for connecting to an analogue to digital converter (ADC) of a broader signal chain lineup; wherein the interface receives digital data from the ADC; a field programmable gate array (FPGA) including a microprocessor and instructions executed by the microprocessor for converting the digital data into two digital signal paths; the two signal paths consisting of a frequency domain path and a time domain path; a memory and/or high speed bus for storing data from the frequency domain path and the time domain path.

In one aspect of the invention, one of the ADC or FPGA includes a quadrature down-convertor for transforming received analogue data to I/Q time domain data streams.

In another aspect of the invention, the ADC comprises a pair of wide band tuners for transforming received analogue data to two 125 MHz bands converted to I/Q streams.

In another aspect of the invention, the frequency domain path includes FPGA circuit logic implementing a fast Fourier transform to convert the digital signal into the frequency domain.

In another aspect of the invention, the frequency domain path further includes windowing logic executed prior to the fast Fourier transform.

In another aspect of the invention, the fast Fourier transform logic and the windowing logic are dynamically alterable within the FPGA to accommodate different modes of operation for the receiver system.

In another aspect of the invention, the time domain path includes FPGA circuit logic implementing a decimation of the time domain signal, simultaneously with the conversion into the frequency domain; whereby two representations of the digital signal are generated simultaneously.

In another aspect of the invention, the time domain path further includes logic for applying decimation to the signal prior to the output.

In another aspect of the invention, the FPGA is configured to transfer both time domain and frequency domain data packets to the memory simultaneously.

In another aspect of the invention, the transfer of time and frequency domain data is implemented over a high speed bus.

In another aspect of the invention, the receiver is configured as a wideband digital receiver for use in a wideband signal chain lineup having a plurality of operating modes consisting of or selected from military electronic attack, military electronic support applications, and tactical communications.

In another aspect of the invention, the receiver is configured for use in electronic warfare applications, whereby more information may be deciphered through simultaneous use of frequency and time domain data.

In another aspect of the invention, the receiver supports concurrent algorithms collectively requiring time and frequency domain data.

In another embodiment of the invention, there is provided an ultra-wideband radio receiver including a radio frequency (RF) port for receiving an incoming wideband signal; a direct digital synthesis (DDS) signal generator providing a signal within a first bandwidth; a frequency multiplier in signal communication with the DDS signal generator; the frequency multiplier adapted to convert the signal within the first bandwidth to a multiplied signal within a second bandwidth, wherein the second bandwidth encompasses a wider frequency range than the first bandwidth; a processor in communication with the DDS signal generator for programming the DDS signal generator to provide the signal within the first bandwidth; the processor further adapted to reprogram the DDS signal generator to alter the first bandwidth; a radio frequency (RF) mixer for mixing the incoming wideband signal with the multiplied signal to generate an intermediate frequency signal; an analogue to digital converter (ADC) for receiving the intermediate frequency signal and converting the intermediate frequency signal into a digital signal; an interface for connecting to the ADC to a field programmable gate array (FPGA); the FPGA and associated configuration used for converting the digital data to two digital signal paths; the two digital signal paths consisting of a frequency domain path and a time domain path; a memory for storing data from the frequency domain path and the time domain path.

In another aspect of this embodiment, the ADC comprises a pair of wide band tuners for transforming received analogue data to two 125 MHz bands converted to I/Q streams.

In another aspect of this embodiment, the FPGA further comprises a switch for selecting one of the two I/Q stream bands.

In another aspect of this embodiment, the frequency domain path includes FPGA circuit logic implementing a fast Fourier transform to convert the digital signal into the frequency domain.

In another aspect of this embodiment, the frequency domain path further includes windowing logic executed prior to the fast Fourier transform.

In another aspect of this embodiment, the fast Fourier transform logic and the windowing logic are dynamically alterable within the FPGA to accommodate different modes of operation for the receiver system.

In another aspect of this embodiment, the time domain path includes FPGA circuit logic implementing a digital down conversion on the time domain path, simultaneously with the conversion into the frequency domain; whereby two representations of the digital signal are generated simultaneously.

In another aspect of this embodiment, the time domain path further includes logic for applying a variable decimation to the signal prior to the conversion into the time domain.

In another aspect of this embodiment, the FPGA is configured to transfer both time domain and frequency domain data packets to the memory.

In another aspect of this embodiment, the transfer of time and frequency domain data is implemented over a high speed bus.

These and other features and advantages of the present invention will become apparent from the following description of the invention, when viewed in accordance with the accompanying drawings and appended claims.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

One or more embodiments of the present invention are illustrated in the figures of the accompanying drawings which are meant to be exemplary and not limiting, in which like references are intended to refer to like or corresponding parts, and in which.

DETAILED DESCRIPTION OF THE INVENTION

In various military or electronic countermeasure applications, it may be beneficial to have access to frequency and time domain data of radio frequency (RF) signals simultaneously in real time, without the need to perform subsequent mathematical conversions. This would permit different types of analysis and responses to the received RF signals. For EW applications this provides a more acute and accurate picture of a detected signal. Signal classification and EA algorithms, for example, benefit from simultaneous frequency and time domain data.

The present disclosure relates generally to a streaming receiver, which could be implemented as part of a broader signal chain lineup. The streaming receiver as herein described is preferably implemented on an independent circuit board or card which could be connected inline prior to a memory transfer over a high speed bus to where the detected signal is stored, either on a short term or longer term basis.

A wideband receiver is suitable for servicing a broad range of applications that use this bandwidth, and in particular, Force Protection Electronic Attack (FPEA) or jamming applications, Electronic Support (ES), and Tactical Communications (TC) applications. The receiver preferably implemented in a signal chain lineup, which is capable of operating in each of these applications. One such signal chain lineup is described in applicant's PCT International Application No. PCT/CA2014/050707, entitled "System and Method for Ultra-Wideband Radio Frequency Scanning and Signal Generation", filed Jul. 25, 2014, the contents of which are incorporated by reference herein in their entirety.

Figure 1A:
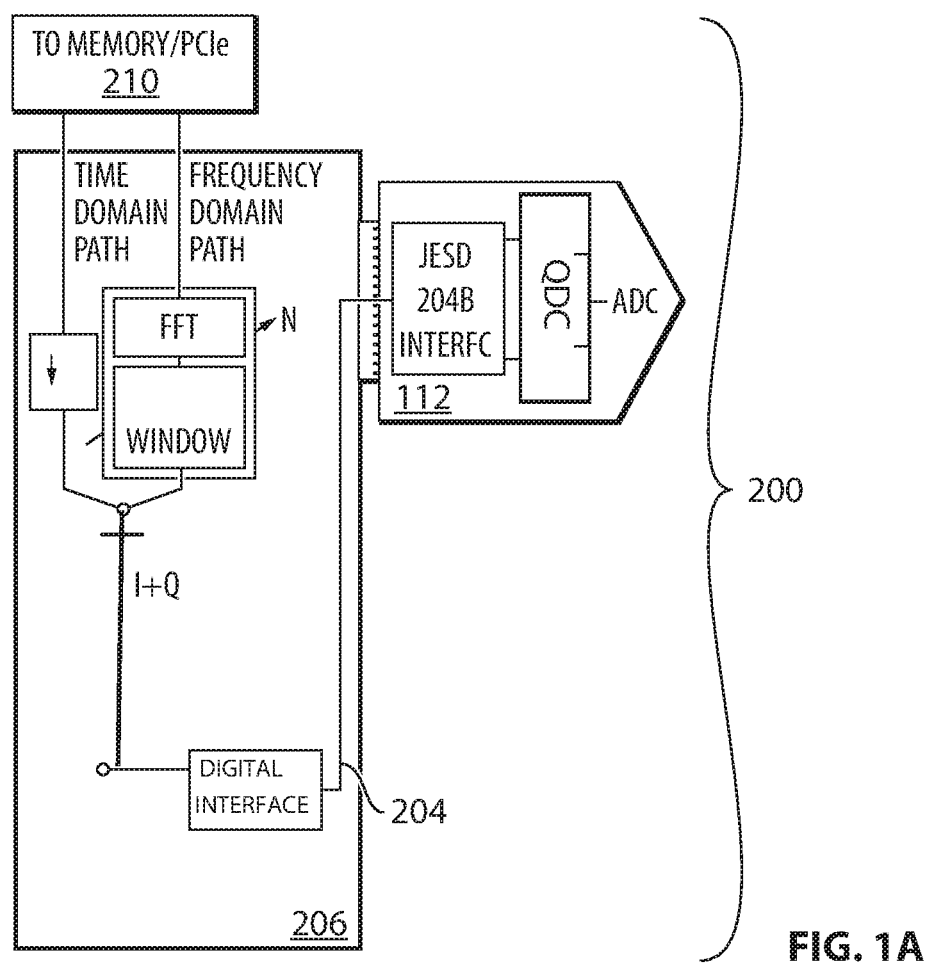
FIG. 1A is a schematic diagram of a receiver for processing a signal into frequency and time domains according to one embodiment of the invention.

Referring now to FIG. 1A, there is shown one embodiment of the invention in which an analogue-digital converter (ADC) 112 of a broader signal chain lineup (not shown) is connected to an FPGA 206 in order to create a system 200 that outputs for storage or transfer of two signals: one in the time domain and one in the frequency domain. The FPGA takes the signals from the ADC and creates the frequency and time domain signals before sending them to a memory unit and/or data bus for storage and/or further processing. It is contemplated that various forms of storage may be used, whether temporary, long term or transient. The streaming receiver is preferably implemented entirely within the FPGA, but it is also contemplated that certain elements may be separated out. Furthermore, other forms of implementing the circuit are also contemplated, aside from the use of an FPGA.

Broadly, the system 200 (being a subsystem of a broader signal chain lineup) preferably includes an analog to digital converter (ADC) 112, high-speed serial digital interface 204, Field Programmable Gate Array (FPGA) 206, and output port 210. The ADC 112 may alternatively form part of an existing signal chain lineup into which the FPGA 206 is connected via the interface 204. In this manner, the system 200 may be retrofitted, or plugged into an existing receiver device at its ADC.

ADC 112 may be any device capable of converting an analog signal such as a continuous physical quantity (usually a voltage) to a digital signal such as a number that represents the quantity's amplitude. In a preferred implementation, ADC 112 is capable of outputting I/Q data, for example I/Q data with a sampling rate in the order 156.25 MHz. Reference to I/Q data is made with the common understanding of the term, and in particular, the I/Q data represents the changes in magnitude/amplitude of a sine wave, which is the more common form in which signals are represented and processed. Preferably, the I/Q data is sampled at a sampling rate higher than the Nyquist rate.

Figure 1B:
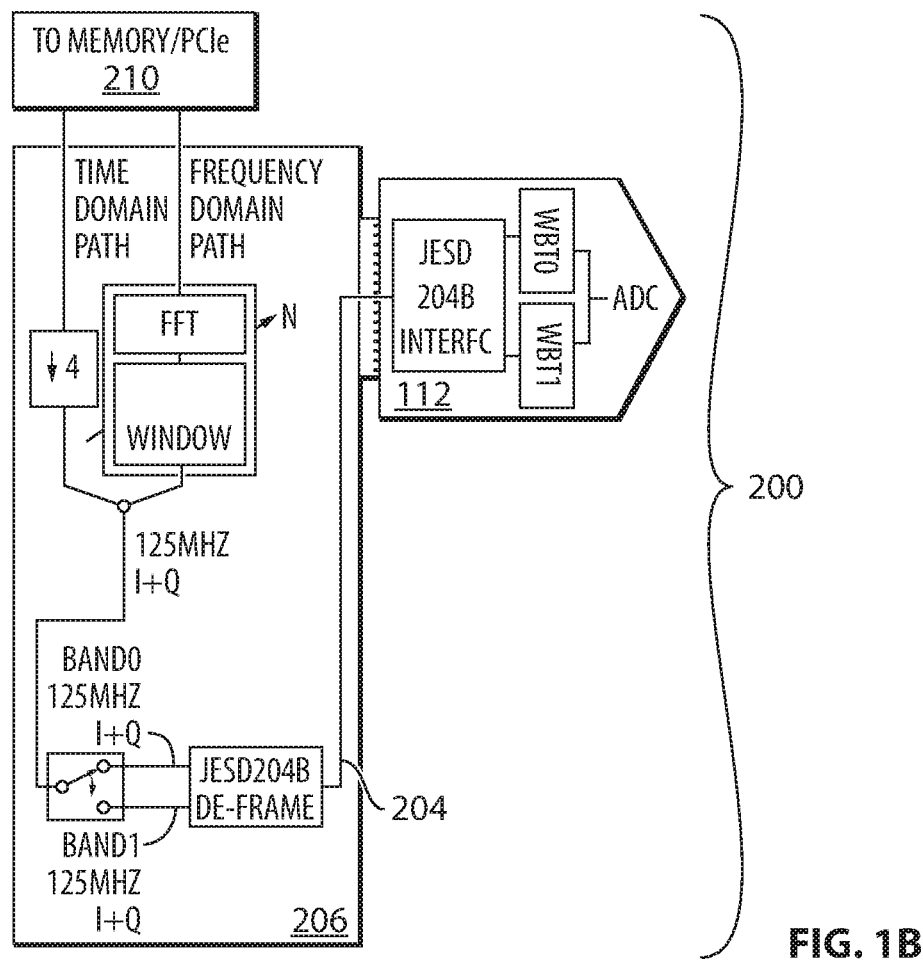
FIG. 1B is an alternative to the embodiment of FIG. 1A.

In one alternative, shown in FIG. 1B the ADC will be capable of outputting two wide-band regions simultaneously with different numerically controlled oscillator (NCO) settings. ADC 112 may be reconfigurable by the FPGA 206 to move to NCO frequency if requested by an RX sequencer (shown in FIG. 2) in a ping-pong fashion. That is to say, in embodiments in which an existing ADC 112 is present, the FPGA 206 may include a controller, or other means of reconfiguring the ADC 112 to output two wide-band signal regions simultaneously. This ADC 112 may further comprise two wide band tuners WBT0 and WBT1, which would be used to reduce a typical received bandwidth from 1000 MHz to two 125 MHz bands with I and Q streams sampled at 156.25 MHz, for example. This bandwidth and output stream are the preferred streams for manipulating by the FPGA 206, as described below. The preference for working with a 125 MHz receiver is to service a broad range of applications.

ADC 112 streams time domain data into the lanes of high speed data, as the converted digital data. Optionally, high speed data would conform to the JESD204B data standard. It will be apparent to one of skill in the art that other standards may be developed and used in place of the JESD204B standard for this or other embodiments of the systems of this invention. The JESD204B standard is described in "Serial Interface for Data Converter", JEDEC Standard JESD204B01, JEDEC Solid State Technology Association, January 2012, herein incorporated by reference in its entirety. A lower speed parallel data converter interface such as JESD207 may also be employed. An interface is provided by which the FPGA 206 is connected to the ADC 112, and is preferably a high speed serial port 204 on the FPGA 206. There may be a connector that connects and transfers data between the ADC 112 and FPGA 206.

Field Programmable Gate Arrays in general are well known in the art, and broadly consist of a configurable integrated circuit containing an array of programmable logic blocks capable of performing complex combination functions. The particular FPGA 206 used in one embodiment of the invention may be specifically adapted to support a time domain and a frequency domain path that operates concurrently. In addition, the FPGA 206 is capable of supporting frequency domain conversions of time domain I/Q data from ADC 112.

In the alternative of FIG. 1B, FPGA 206 may further comprise a switch which would allow a user to select one of two 125 MHz I/Q signals, identified band 0 or band 1, for signal processing. This selection may be accomplished by way of pre-defined parameters or on a real-time operational basis. Once the selection of either band 0 or band 1 is made, in embodiments where this switch is present, the FPGA 206 includes logic to split the signal into a Time Domain Path and a Frequency Domain Path.

For the Frequency Domain Path, a Fast Fourier Transform (FFT) may be applied to convert the signal from the time domain to the frequency domain. Optionally, and prior to the conversion, a windowing process may be applied to zero a given range of the original I/Q domain signal. The windowing and FFT algorithms/processes are preferably dynamically alterable within the FPGA; for example, by selecting a windowing function and appropriate transform length it is possible to have a scalable resolution bandwidth.

For the Time Domain Path, a variable decimation factor of M is preferably applied to achieve the target data rate. The actual conversion of sample rate may be accomplished by any particular process or algorithm known in the signal processing arts.

External port 210 may be a high speed bus such as Peripheral Component Interconnect Express (PCIe) serial expansion bus that may connect FPGA 206 to a microprocessor memory peripheral device. The FPGA may provide an interrupt to the microprocessor after a configurable amount of packets have been transferred. FPGA 206 may provide configurable settings to transfer both time domain packets and frequency domain packets simultaneously, or separately, through packet DMA.

For real time operation packet DMA is preferred due to minimized setup time and an interrupt generated by the FPGA to indicate completion of N packets. The FPGA manages the microprocessor's memory and places status information in memory location 0 followed by N frames. Frames are preferably received in an isochronous fashion and their completion is marked with an interrupt from the FPGA.

The microprocessor can detect overflow through a combination of monitoring timestamps and packet count in the packet headers. For the 125 MHz receiver, each configuration generates a separate stream of frequency and time domain packets.

The overall receiver design may be subject to a number of optional design constraints. For example, when operating in the FPEA mode of operation, the receiver is capable of generating frequency domain data using an FFT with a scalable bandwidth resolution. The minimum scalable bandwidth resolution is typically 10 kHz or better, but operation can also be possible with a much coarser resolution bandwidth which may be more appropriate to multi-band data captures or to reducing processing requirements on the microprocessor.

The ES mode of operation may involve use of time domain samples, but the host processor, in some cases, can only support a limited stare bandwidth. The target maximum stare bandwidth is typically 25 MHz (or Fs=32.5 MHz I/Q) and reflects the maximum channel size for a wideband threat. This mode of operation is also compatible with the TC mode since it is designed such that the microprocessor will have sufficient processing power to further decimate the data prior to usage if required.

In a preferred use, the receiver is used to output time domain signal data for the purposes of advanced signal classification to advance jamming applications beyond the frequency domain. In this implementation, the frequency and time domain data are sent to a signal classifier (not shown), where a detected signal can be analyzed in real-time to a more acute extent than in the prior art; and from which a fine tuned and effective jamming signal can be produced to counter remote controlled improvised explosive device (RCIED) threats.

Figure 2:
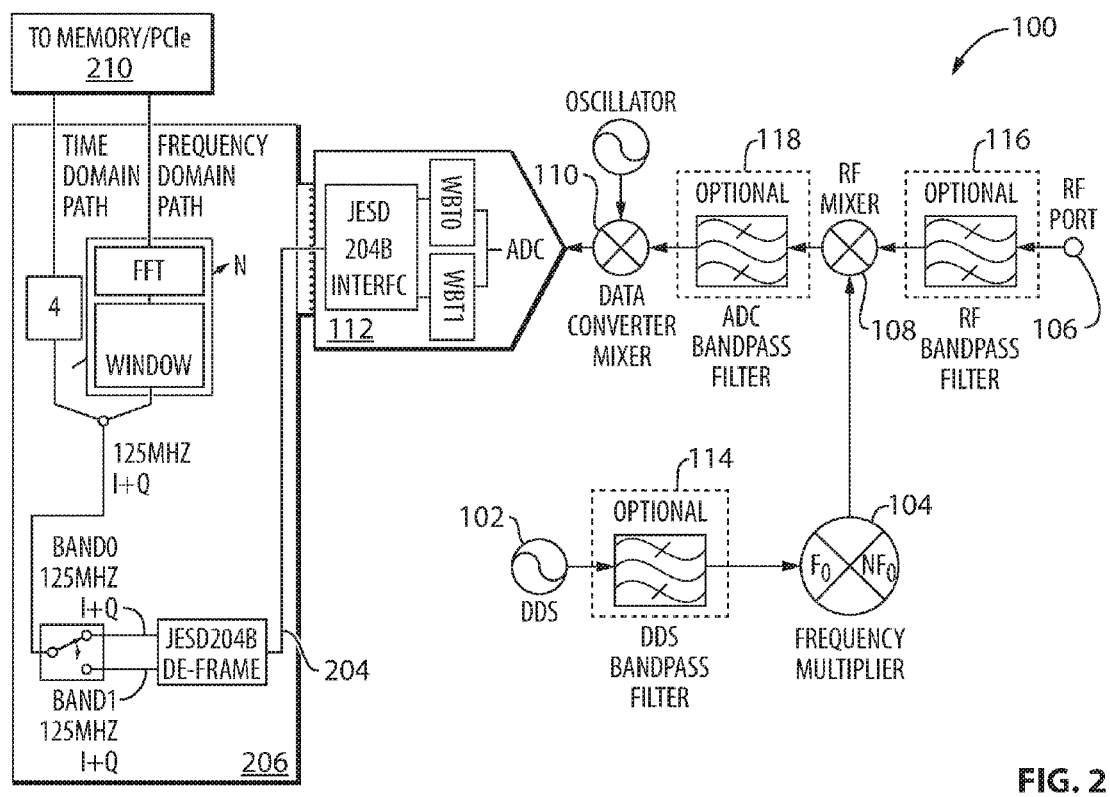
FIG. 2 is a diagram of the receiver of FIG. 1B in an exemplary signal chain lineup.

Referring now to FIG. 2, there is shown an embodiment of the invention implemented in a broader signal chain lineup operating as a receiver of RF communications and performing ultra-wideband signal capture. The broader signal chain lineup was disclosed in PCT International Application No. PCT/CA2014/050707, the contents of which are incorporated by reference. The system 100 comprises a direct digital synthesis (DDS) signal generation engine 102 in communication with a frequency multiplier 104. A signal from DDS 102 is frequency multiplied by a frequency multiplier 104 in order to widen the frequency band being scanned. The frequency multiplier 104 is adapted to convert signals from the DDS generation engine, which has a limiting operating range as mentioned above into an ultra-wideband operating range such as DC to 6 GHz.

This is accomplished generally by way of a radio frequency (RF) port for receiving an incoming wideband signal; a direct digital synthesis (DDS) signal generator providing a signal within a first bandwidth; a frequency multiplier in signal communication with said DDS signal generator; said frequency multiplier adapted to convert said signal within said first bandwidth to a multiplied signal within a second bandwidth, wherein said second bandwidth encompasses a wider frequency range than said first bandwidth; a processor in communication with said DDS signal generator for programming said DDS signal generator to provide said signal within said first bandwidth; said processor further adapted to reprogram said DDS signal generator to alter said first bandwidth; and a radio frequency (RF) mixer for mixing said incoming wideband signal with said multiplied signal to generate an intermediate frequency signal. A data converter then converts the intermediate frequency signal to a baseband signal which is received by the ADC for conversion into a digital signal. The ADC is connected to the FPGA as described above.

In general the system operates by providing a direct digital synthesis (DDS) signal generation engine to generate a digital signal. The DDS generation engine can be reprogrammed to operate within particular operating ranges in a relatively short period of time. In the systems disclosed herein, this reprogramming to move the operating range occurs in about 1 microsecond. Current state-of-the-art DDS generation engines have a limited operating range, such as DC to 1.6 GHz, such that in practice the system steers the signal generated by the DDS generation engine to a wideband operating range, such as DC to 6 GHz, which covers the intended operating range target. This may be accomplished through frequency multiplication.

With reference to FIG. 2, an input signal is received at RF port 106, optionally bandpass filtered by filter 116, before being mixed by RF mixer 108 with the frequency multiplied DDS signal. The DDS signal is generated by DDS 102 and optionally bandpass filtered by filter 114 before being frequency multiplied by frequency multiplier 104. The output signal from the RF mixer 108 is preferably an intermediate frequency (IF) signal. The IF signal, optionally bandpass filtered by filter 118, is then mixed by the data converter/mixer 110 to generate a baseband signal that is sampled by the analog to digital converter ADC 112.

The FPGA 206 would then be connected to the ADC 112 via the port 204, and output data in both the frequency and time domains, as described with respect to either FIG. 1A or 1B, above. While FIG. 2 shows the FPGA of FIG. 1B, it could readily be substituted with the FPGA of FIG. 1A.

Figure 3:
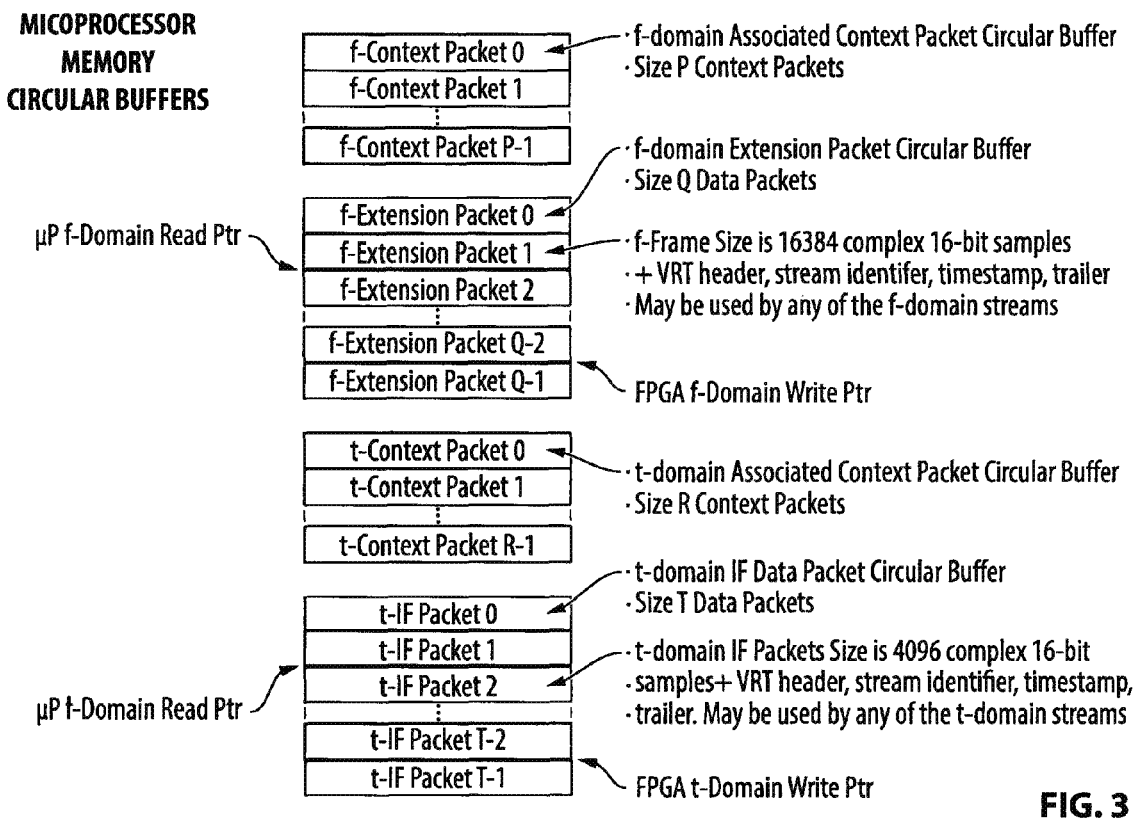
FIG. 3 is a diagram of the memory structure for the context and data packet streams according to an embodiment of the invention.

Turning now to the particulars of data output and storage, and referring to FIG. 3. The memory is preferably divided into four circular buffer sections. The sections are frequency domain context and extension data packet streams; and time domain context and IF Data packet streams. The context packets are generally a smaller buffer size since they occur only at a transition from one receiver configuration to the next.

The following depicts a likely microprocessor workflow being woken up by an interrupt, requiring data storage:
1. Thread blocks on DMA interrupt
2. Thread unblocks
3. Read the frequency extension data packet and/or time domain IF data packet
4. If the "E" bit of the trailer is set and the number of associated context packets is 1, then read associated context packets until the one with the matching stream and same timestamp is found. Update the power reference level setting based on the context packet.
5. Process frequency or time domain extension/IF data frames until a discontinuity in the stream is detected
6. Make a local copy of information received if required
7. Perform signal processing on M frames
8. Go to 1

System 200 processing may be compliant with several signal standards known in the art. One of which may be the VITA49 Radio Transmission (VRT) protocol. The four packet stream classes being IF Data packet, IF Context packet, Extension Data packet, Extension Context packet. Table 1 is an excerpt from *VITA Radio Transport (VRT) Draft Standard*, VITA 49.0—2007, Draft 0.21, Oct. 31, 2007, p. 27, Table 4.1.1-1, which is herein referred to as "VRT" and incorporated herein by reference in its entirety. Table 1 shows highlights of the packet stream classes:

TABLE 1

| | The Four Categories of Packet Streams* | |
|---|---|---|
| Contents | Standard Formats | Custom Formats |
| Data | IF Data Packet Stream<br>Conveys a digitized IF signal (IF Data)<br>   Real/complex data<br>   Fixed/floating-point formats<br>   Flexible packing schemes | Extension Data Packet Stream<br>Conveys any signal or any data derived from a signal<br>   Any type of data<br>   Custom packet format |
| Context | IF Context Packet Stream<br>Conveys common Context for IF Data<br>   Frequency<br>   Power<br>   Timing<br>   Geolocation<br>   Etc. | Extension Context Packet Stream<br>Conveys additional Context for IF Data or Extension Data<br>   Any kind of Context<br>   Custom packet format |

*Packet Streams may convey either Data or Context and may be either standard or custom in format.

Generally time domain data may be packetized in IF data packets and frequency domain data (derived data) may be packetized in Extension data packets. The IF context packet stream may contain the information used to contextualize the IF data such as the tuned centre frequency, power level, time of receipt, location, etc. The extension context packet stream may contain information about the transformation performed on the data such as the number of Fast Fourier Transform (FFT) points.

Digital IF data may typically be time domain samples and extension data may be a signal or other data derived from the digital IF signal. In the 125 MHz receiver case, the decimated time domain path may be the digital IF data and the frequency domain path may be extension data. Context packets may transmit metadata that may define the method by which the digital IF data or extension data was procured or transformed.

The logic or algorithm implemented on the FPGA preferably also accounts for the following:

Information about the center frequency and ADC settings in the ultra-wideband tuner may form the tuner context data;

Information about the ADC configuration such as the sample rate, number of bits, and wide band tuner settings may form the ADC context data;

Information about the selection of which of the two wide-band tuner bands in the ADC is being processed may form the band selection context data;

Information about the settings for the FFT such as the chosen window and the length of transform may form the FFT context data; and Information about the decimation factor in the time domain path may form the decimation context data.

The output of the frequency domain path may be a combination of the extension data (frequency domain samples) and the FFT, band selection, ADC, and tuner context data. The context data may not be a continuous stream. Transmission of the context data may only be required when the values change.

The output of the time domain path may be a combination of the digital IF data (time domain samples) and decimation, band selection, and ADC context data.

The system 200 in one embodiment may use VRT defined timestamp methodology which may allow for precise determination of when a signal was received or when it was processed. The algorithm implemented by the system may utilize precise information about when a block of signals was processed for the purposes of data reconstruction and further processing. Time information may be relevant for jamming, signals intelligence and tactical communications applications. The time information may also be used for geolocation.

VRT defines digital IF data (typically time domain samples) and extension data which is a signal or other data derived from the digital IF signal. In the 125 MHz receiver case the decimated time domain path is the digital IF data and the FFT path is extension data. VRT further defines context packets which transmit metadata to define the method by which this digital IF or extension data was procured or transformed.

In our receiver algorithm, information about the centre frequency and ADC settings in the ultra-wideband tuner form the tuner context. Information about the ADC configuration such as the sampling rate, number of bits and wideband tuner settings forms the ADC context data. Information about the selection of which of the two wide-band tuner bands in the ADC is being processed forms the band selection context data. Information about the settings for the FFT such as the chosen window and length of the transform form the FFT context data. Information about the decimation factor in the time domain path form the decimation context data.

The output of the frequency domain path is a combination of the extension data (frequency domain samples) in combination with context data for the FFT, band selection, the ADC and the tuner. The context data need not be a continuous stream, transmission of the context data only when these values change is suitable to define the stream.

The output of the time domain path is a combination of the digital IF data (time domain samples) in combination with the context data for the decimation, band selection, the ADC and the tuner. Again, the context data need not be a continuous stream.

VRT defines a precision timestamp methodology to allow for precise determination of when a signal was received or when it was processed. The receiver algorithm according to one embodiment may utilize precise information about when a block of samples was processed for the purposes of data reconstruction and further processing. This time information is relevant for jamming, signals intelligence and tactical communications applications. Further this timing information may be used for geolocation.

Additional details specific to VRT compliant data storage, including the specific format for preferred data storage, header information, data packet details, etc., can be found in the aforementioned VITA Radio Transport (VRT) Draft Standard, VITA 49.0—2007, Draft 0.21, 31 Oct. 2007; the contents of which are herein expressly incorporated by reference.

This concludes the descriptions of the preferred embodiments. The description should be understood as illustrative of the invention, but should not be considered as limiting the invention, which are limited by solely by the claims which now follow.

All patents, patent applications, and literature references cited in this specification are hereby incorporated herein by reference in their entirety. In case of conflict, the present description, including definitions, will control.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A wideband signal processing receiver system comprising:
    an interface for connecting to an analogue to digital converter (ADC) of a broader signal chain lineup, wherein said interface receives digital data from said ADC;
    a field programmable gate array (FPGA) including a microprocessor and instructions executed by said microprocessor for converting said digital data into two digital signal paths; and
    a memory and/or high speed bus for storing data from said two digital signal paths;
    wherein a first digital signal path includes FPGA circuit logic implementing windowing logic and a fast Fourier transform to convert the digital signal into the frequency domain;
    and wherein the fast Fourier transform logic and the windowing logic are dynamically alterable within the FPGA to accommodate different modes of operation for the receiver system.

2. The receiver system according to claim 1, wherein one of the ADC or FPGA includes a quadrature down-convertor for transforming received analogue data to I/Q time domain data streams.

3. The receiver system according to claim 1, wherein the ADC comprises a pair of wide band tuners for transforming received analogue data to two 125 MHz bands converted to I/Q streams.

4. The receiver system according to claim 1, wherein a second digital signal path includes logic to convert the digital signal into the time domain, and further includes FPGA circuit logic implementing a decimation of the time domain signal, simultaneously with the conversion into the frequency domain, whereby two representations of the digital signal are generated simultaneously.

5. The receiver system according to claim 4, wherein the time domain path further includes logic for applying decimation to the time domain signal prior to the output.

6. The receiver system according to claim 1, wherein the FPGA is configured to transfer both time domain and frequency domain data packets to the memory simultaneously.

7. The receiver system according to claim 6, wherein the transfer of time and frequency domain data is implemented over a high speed bus.

8. The receiver system according to claim 1, wherein the receiver is configured as a wideband digital receiver for use in a wideband signal chain lineup having a plurality of operating modes selected from military electronic attack, military electronic support applications, and tactical communications.

9. The receiver system according to claim 1, wherein the receiver is configured for use in electronic warfare applications, whereby more information may be deciphered through simultaneous use of frequency and time domain data.

10. The receiver system according to claim 1, wherein the receiver supports concurrent algorithms collectively requiring time and frequency domain data.

* * * * *